United States Patent [19]

Cravatts

[11] Patent Number: 5,952,643

[45] Date of Patent: Sep. 14, 1999

[54] BAR CODE DECODER FOR A LIGHTPEN

[75] Inventor: Mark Robert Cravatts, Berkeley Heights, N.J.

[73] Assignee: Lucent Technologies Inc., Murray Hill, N.J.

[21] Appl. No.: 08/820,661

[22] Filed: Mar. 17, 1997

[51] Int. Cl.[6] .................................................. G06K 7/10
[52] U.S. Cl. ............................... 235/462.19; 235/462.01; 235/462.25
[58] Field of Search ..................................... 235/462, 472, 235/463, 470, 494, 462.01, 462.07, 462.08, 462.09, 462.1, 462.11, 462.16, 462.19, 462.25, 472.01

[56] References Cited

U.S. PATENT DOCUMENTS

| | | | |
|---|---|---|---|
| 4,146,782 | 3/1979 | Barnich | 235/472 |
| 4,282,426 | 8/1981 | Neseem et al. | 235/463 |
| 4,289,957 | 9/1981 | Neyroud et al. | 235/462 |
| 4,329,574 | 5/1982 | Jordan, Jr. | 235/463 |
| 4,409,469 | 10/1983 | Yasuda et al. | 235/463 |
| 4,575,625 | 3/1986 | Knowles | 235/467 |
| 4,667,089 | 5/1987 | Shirakabe et al. | 235/462 |
| 5,045,677 | 9/1991 | Okamura | 235/462 |
| 5,081,342 | 1/1992 | Knowless et al. | 235/436 |
| 5,194,722 | 3/1993 | Mergenthaler et al. | 235/463 |
| 5,343,027 | 8/1994 | Knowles et al. | 235/462 |

*Primary Examiner*—Thien Minh Le
*Assistant Examiner*—Michael G. Lee

[57] ABSTRACT

A decoding facility for decoding signal samples characterizing symbols forming a particular pattern. The decoding facility, more particularly, forms the signal samples into groups and each group is decoded into a known symbol. This is done by matching a group of samples with each of a plurality of known symbols and selecting and outputting as the decoded symbol that one of the known symbols that is the closest match to the group of signals being processed.

10 Claims, 6 Drawing Sheets

UPC CHARACTER CODING

| DECIMAL VALUE | LEFT CHARACTER | RIGHT CHARACTERS |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

BAR CODE DECODER FOR A LIGHTPEN

FIELD OF THE INVENTION

The invention relates to the processing of coded symbols received from a scanning device.

BACKGROUND OF THE INVENTION

As is well-known, a so-called bar code is scanned using a scanning device that emits a thin beam of light generated by a source, e.g., a laser or light emitting diode, etc. The scanning device may be a so-called hand-held light pen/wand that is manually swept across the bar code. As the light pen moves across the bar code, the light beam is reflected by the white segments (spaces) of the bar code and is absorbed by the black segments (bars).

A light sensitive scanner, e.g., a photodiode, outputs an electrical signal in response to the reflected light. Thus, the presence and absence of such signals are used to detect a bar-to-space transition and space-to-bar transition as well as the interval (i.e., the width of a space or bar) between the transition. The interval is typically measured by counting the number of clock signals outputted by a source of such signals that occur within the interval, i.e., between transitions. The value of the count along with a "sign" character indicating whether the interval is a space or bar is sent to a processor. The processor stores the count and its sign in memory.

It can be appreciated that the value of an interval count for a particular space or bar of a bar code will be proportional to the speed at which a light pen is swept across the bar code. The count will be high if such speed is low and vice-versa. Moreover, the speed at which a light pen is swept across a bar code typically increases substantially near the end of the swipe. In that case, then, the interval count for a bar that is scanned at the beginning of the swipe will be much larger than the interval count for a bar of the same width that is scanned at the end of the swipe.

Decoders or correlators which process the output of a light pen to determine the numerical and/or alphabetical representation of the scanned bar code account for the differences in the width of a bar that are due to differences in the speed at which a light pen is swept across a bar code. Such accounting is based on determining the relative widths of the bars and spaces with respect to one another within some margin of error. For example, if the width of a bar is found to be 1.5 to 2.5 times greater than the width of another bar determined to have a width of one unit, then such processing concludes that the width of the former bar is twice that of the latter bar. However, in a case where the width of a scanned bar is actually twice the width of a one unit bar but is reported to be, for example, 1.4 times greater than that width, then the processor would conclude, based on relative weighting, that the width of the former bar was one unit wide. Thus, the scanning of the bar code could lead to an incorrect result.

SUMMARY OF THE INVENTION

The foregoing problems are dealt with by eliminating the need to use relative widths in the decoding of the characters forming a scanned symbol.

Specifically, in accordance with various aspects of the invention, signal samples characterizing a scanned symbol are formed into groups in which each group characterizes a respective one of the symbols. Each group of signal samples is processed in turn by (a) generating a plurality of known symbols, (b) matching the group of signal samples being processed with each of the plurality of known symbols, and (c) selecting and outputting as the decoded symbol that one of the plurality of known symbols that is the closest match to the group of signal samples being processed.

These and other inventive aspects are set forth in the following description and accompanying drawings.

DETAILED DESCRIPTION

An illustrative embodiment of the invention will be discussed in the context of scanning the well-known Universal Product Code (UPC), version format "A", and decoding the result of the scan. As will be shown below, the claimed invention may be used to decode the result obtained from scanning other types of bar codes, e.g., a so-called "Code 128" which includes a complete ASCII set, the Plessy code, and such codes as "code 93" and "code 11", etc. The claimed invention may also find application as a decoder in other digital applications, e.g., as a decoder in a facsimile scanner.

General description of a UPC bar code

Figure 1:
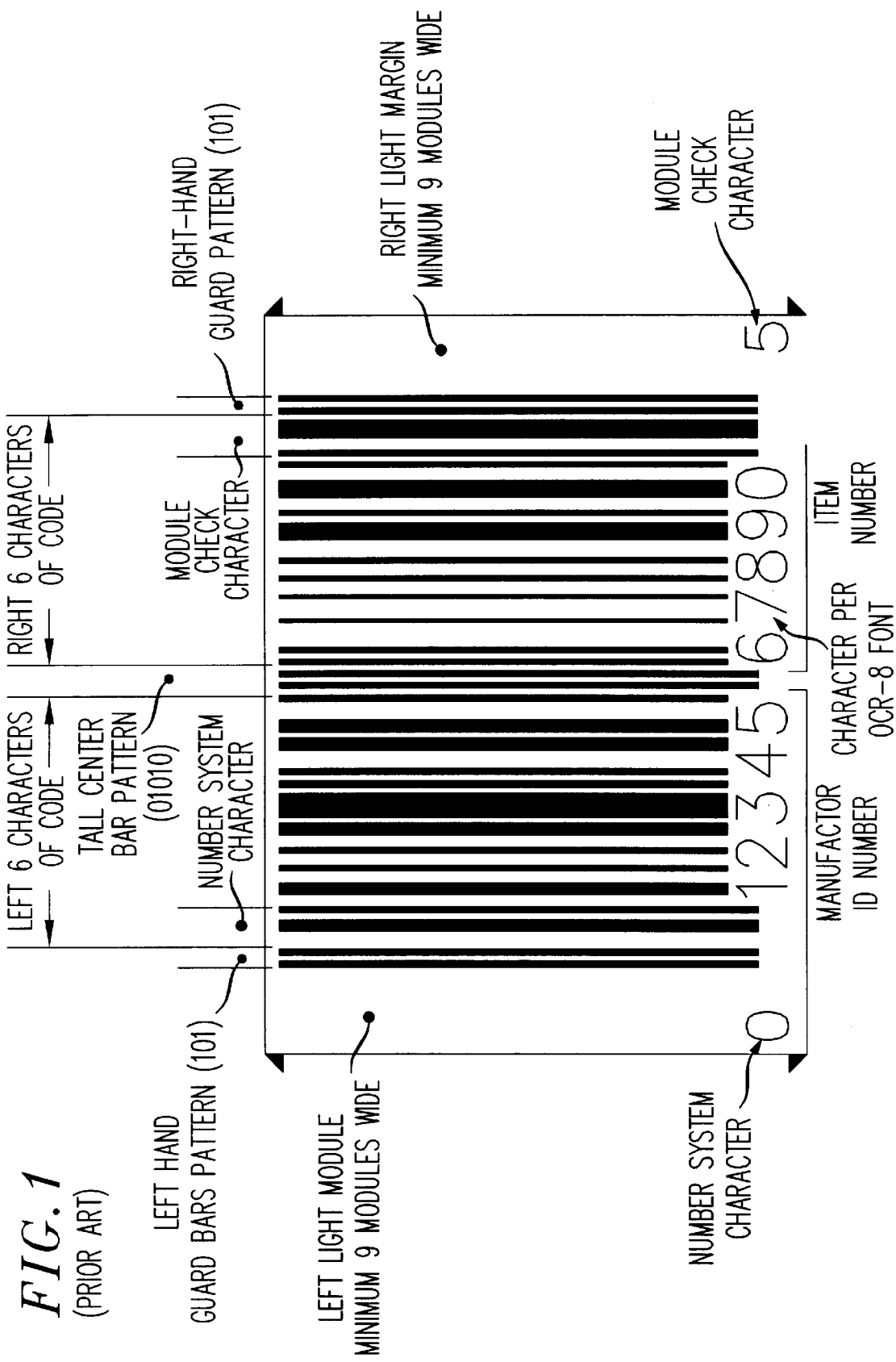
FIG. 1 illustrates the layout of a known UPC bar code.
Figures 2, 3:
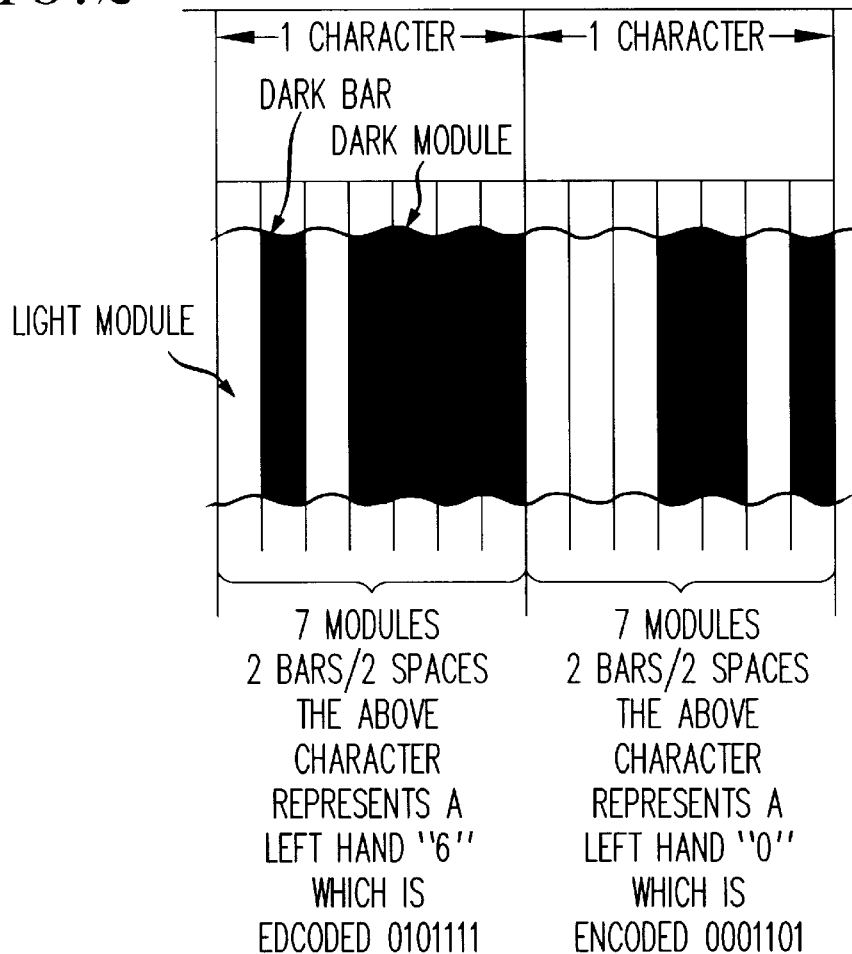
FIG. 2 illustrates the structure of a bar code character.
FIG. 3 is an illustrative example of UPC character coding.

FIG. 1 shows an example of a standard UPC bar symbol comprising twelve characters (digits) of information. The first character of the symbol indicates the number system character, the next five characters represent an identifier, e.g., the identity code of a manufacturer, the following five characters represent an item number, e.g., product code, and the last character is a single modulo check character. The right- and left-hand sides of the symbol each include a light stripe followed by a so-called side-guard pattern. A tall center pattern is positioned at the center of the symbol. The symbol is bar coded using a series of vertical dark and light stripes respectively referred to as bars and spaces. A UPC bar code is always printed on a light/white background and always starts and stops with a dark vertical bar. Dark bars are always separated by a light vertical bar and the widths of the bars and spaces are used to code a UPC symbol, in which such widths are specified as 1, 2, 3 or 4 modules. A zero (0) is used to represent a space one module wide and a one (1) is used to represent a bar one module wide. Seven modules are used to define a character. For example, a pattern of 0001101 is defined by a space three modules wide followed by a bar two modules wide followed by a space one module wide and followed by a bar one module wide (as illustrated in FIG. 2). The values for the characters 0–9 are shown in FIG. 3. Each character has two different values based on whether the character is to the right or left of the center pattern. The characters that are to the left of the center pattern all start with a value of zero (0) and are coded with odd parity, e.g., 0001101. Whereas the characters that are to the right of the center pattern all start with a value of one (1) and are coded with even parity, e.g., 1110010. Such left and right coding is used to differentiate between left-to-right and right-to-left scanning.

As mentioned above, a standard UPC symbol has left and right light margins. Each such margin comprises nine modules. As also mentioned above, a margin is followed by guard pattern. A guard pattern is typically a symmetrical code, e.g., a code of 101, so that the symbol is bounded by two dark bars. The aforementioned tall center pattern has a code/pattern of 01010.

Figure 4:
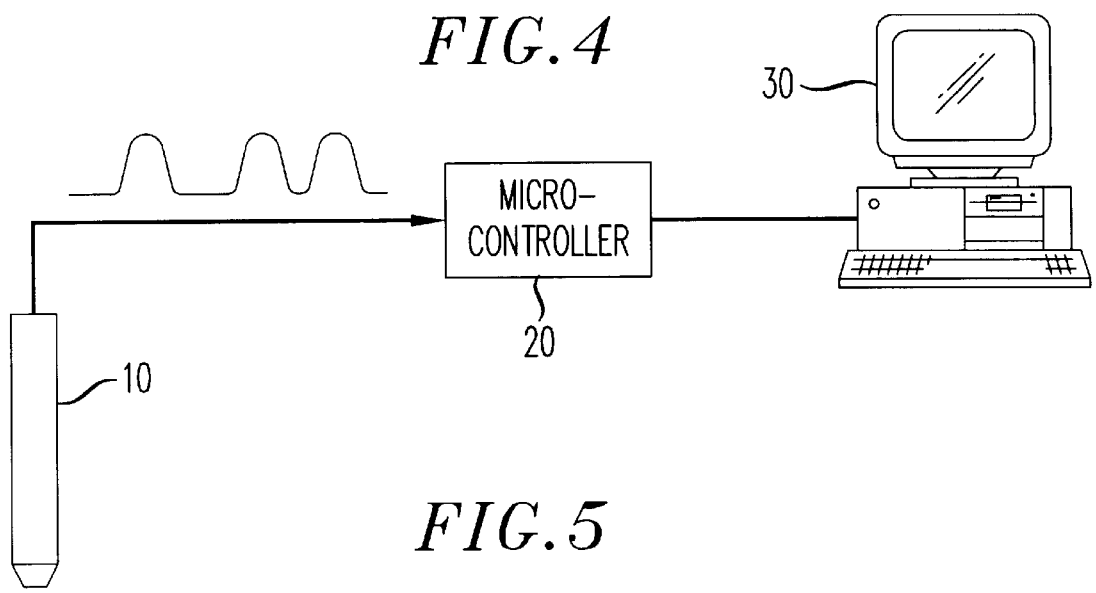
FIG. 4 illustrates in block diagram form a system in which the principles of the invention may be practiced.

An illustrative embodiment of the invention comprising light pen 10, microcontroller 20 and personal computer 30 is shown in FIG. 4. Light pen 10, which may be, for example, the model LA1 1518ROOC-000 light pen available from OPTICON, Orangeburg, N.Y., employs a focused LED light beam which illuminates the surface being scanned, and a light (photo) detector which measures the amount of light from the beam that is reflected by the scanned surface. The light detector outputs an electrical signal having a level that is indicative of the level of reflected light that is being detected. A comparator (not shown) contained in the light pen and coupled to the output of the light pen outputs a logic level of zero (0) when the level of light being detected is small (dark bar) and outputs a logic level of one (1) for the opposite case. Thus, a logic zero (one) is indicative of the fact that the light is passing over a dark bar (light space). Each time the light pen passes from a dark region to a light region, a transition from 0 to 1 occurs at the output of the comparator, and vice-versa. The width of a bar may be measured accurately by measuring the elapsed time between alternating transmissions and by knowing the rate at which the light pen is passing over a symbol. However, only the duration of each bar and space is needed to decode a UPC symbol, as will be discussed below in detail. For example, the width of the spaces and bars forming the side guard patterns (101) are equal. Thus, the scanning of the side bars could be done independent of the scanning rate.

Figure 5:
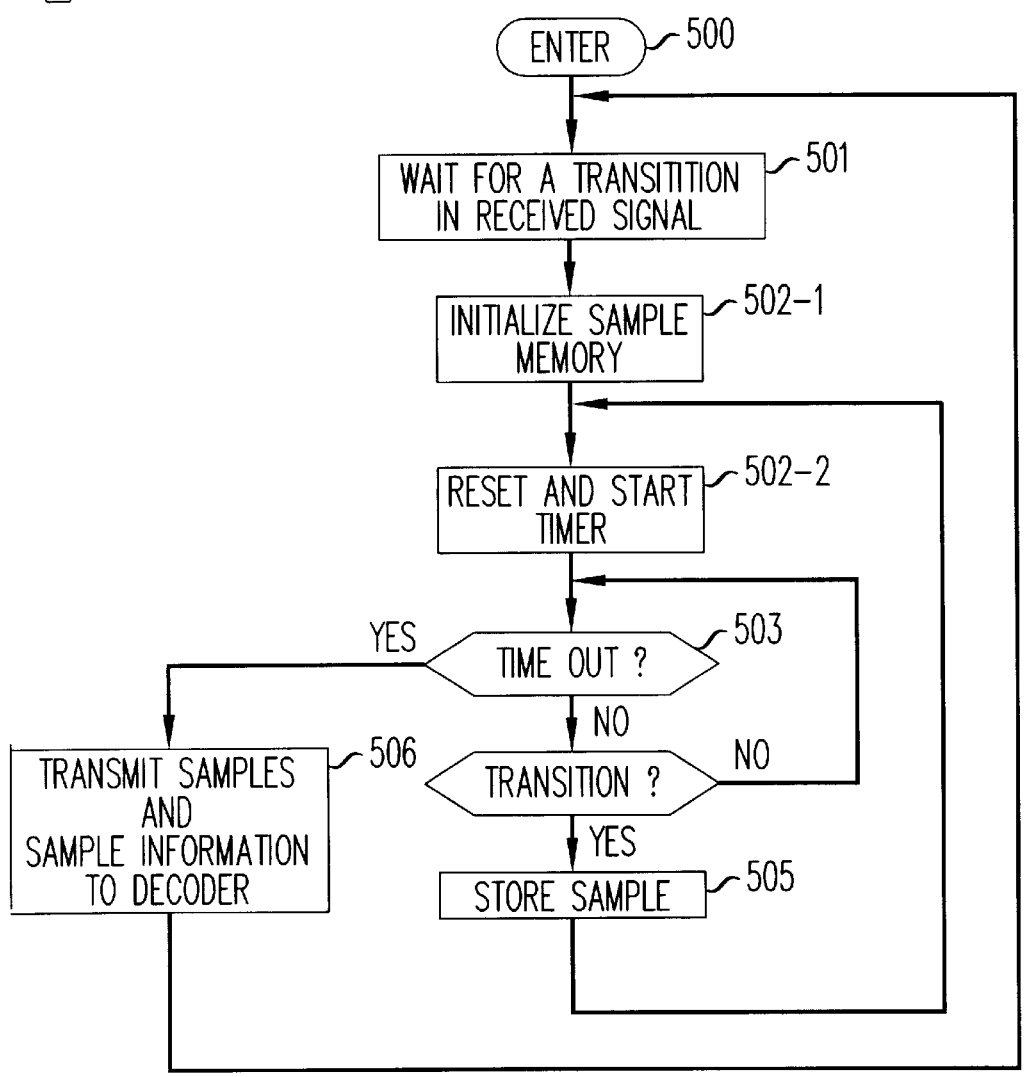
FIG. 5 illustrates in flow chart form the program which implements an aspect of the invention in the microcontroller 20 of FIG. 4.

The output of light pen 10 is supplied to microcontroller 20 (FIG. 4), which may be, for example, an 8051 based microcontroller. Microcontroller 20 is programmed in accordance with the flow chart illustrated in FIG. 5. Specifically, when entered (block 500) the program waits until the signal that it is receiving from light pen 10 changes state, i.e., the level of the signal changes from a first signal level, e.g., a logic zero level, to a second signal level, e.g., a logic one level, or vice-versa. A change (or transition) in the level of the outputted signal is indicative of a change in the start of a scan or transition from scanning a bar (e.g., logic zero) to scanning a space (e.g., logic one). When such a transition occurs (block 501), microcontroller 10 under control of the program (block 502-1) initializes (clears) the memory locations forming a so-called sample memory (not shown). The program (block 502-2) then resets (clears) a timer and then starts the timer (which may be implemented by counting clock signals). The controller 10 program periodically checks the value recorded by the timer/counter to determine if the value is indicative of a time out (block 503). If not, then the program (504) checks to see if the level of the signal that it is currently receiving from light pen 10 has changed. For example, if the signal changed from a "bar" ("space") level signal to a "space" ("bar") level signal. If not, then the program continues to monitor the timer/counter to determine if the timer has timed out, i.e., the program returns to block 503. If the program detects such a transition/change then it stores the timer value (counter value) associated with the previous transition in the aforementioned memory as a sample of the scanned UPC code, and restarts the timer (block 502) to time for the duration of the current sample in the manner discussed above.

If the timer times out, i.e., reaches a count indicative of, for example, 65 milliseconds (which is greater than the maximum duration needed for scanning four modules), then microcontroller 20 under control of the program passes the stored samples to computer 30 (FIG. 4) for decoding. The program then returns to block 501.

Figure 6:
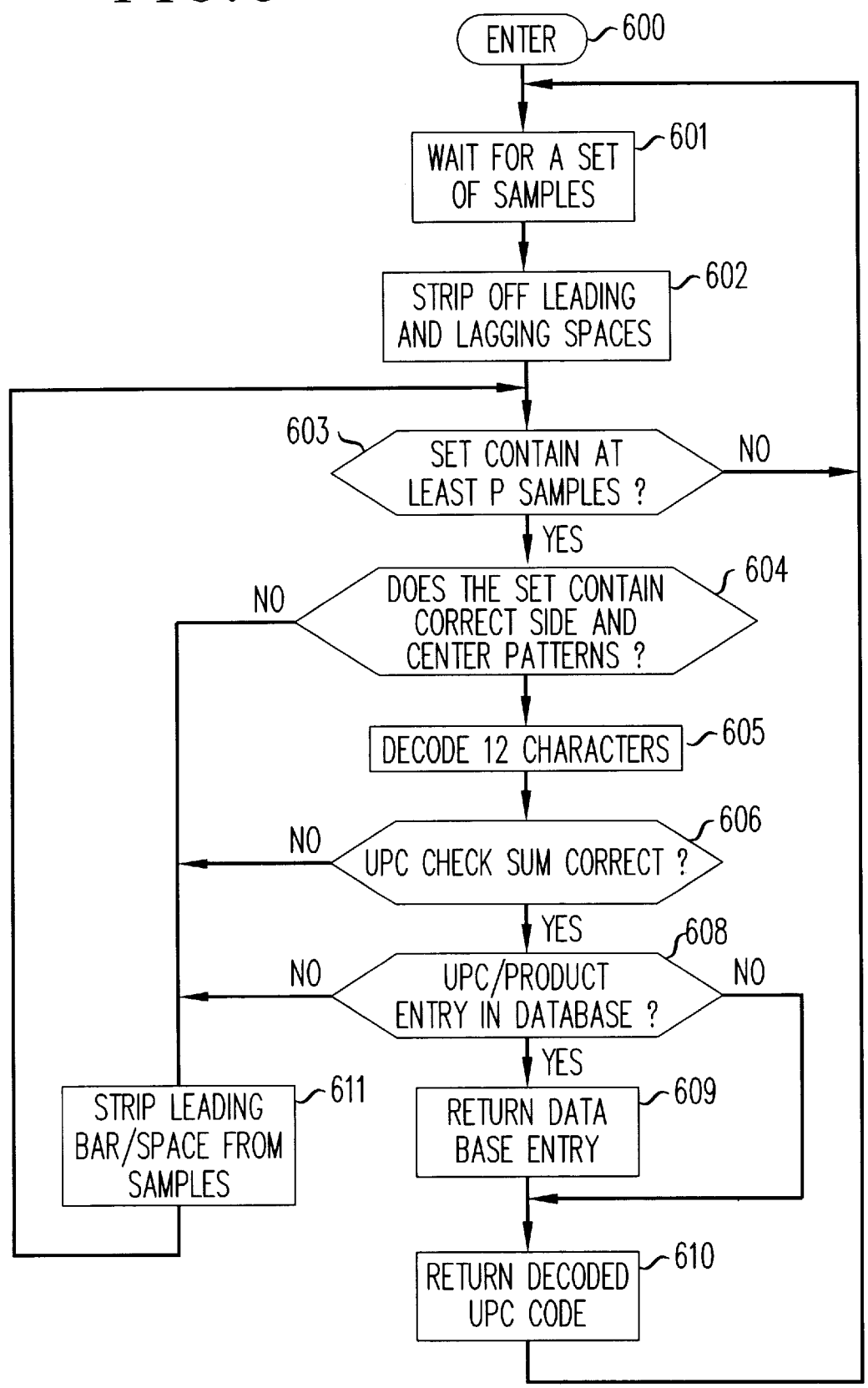
FIGS. 6 and 7 illustrate in flow chart form the program which implements the principles of the invention in the processor 30 of FIG. 4.

A flow chart of the program which controls the decoding operation in computer 30 is illustrated in FIG. 6. Specifically, when entered (block 600), the program (block 601) waits for a set of character samples. When it receives a set of such samples, then the program (block 602) strips off the leading and lagging spaces and then processes the samples (block 603) to determine if the set contains the required number of samples, e.g., 59 samples, necessary to decode a valid UPC code. If not, then the program waits (block 601) for receipt of the next set of such samples. If so, then the program (block 604) determines if the set of samples contains the required side (101) patterns and center (101010) patterns. If not, the program (block 611) removes (strips off) the leading bar and space in the set of samples and returns to block 603 to process the remaining samples. If the set contains the required side and center patterns, then the program (block 605) identifies and decodes the six right-hand and six left-hand characters in accordance with the principles of the invention, as will be discussed below in detail. The program (block 606) then checks the parity bits in the set of samples to determine if the parity bits (see FIG. 1) reflect the correct parity. If not, then the program proceeds to block 611. Otherwise, the program (block 607) processes the check sum value (see FIG. 1) contained in the set of and proceeds to block 611 if the check sum value is not correct. Otherwise, the program translates the decoded characters into an index and uses the index to access an associated database (not shown) containing product information associated with respective UPC codes. If the accessed location contains such information, then the program (block 609) outputs the information to an output port, e.g., a display terminal. The program (block 610) then outputs the decoded UPC code and then returns to block 601 to wait for the next set of sample from microcontroller 20.

Figure 7:
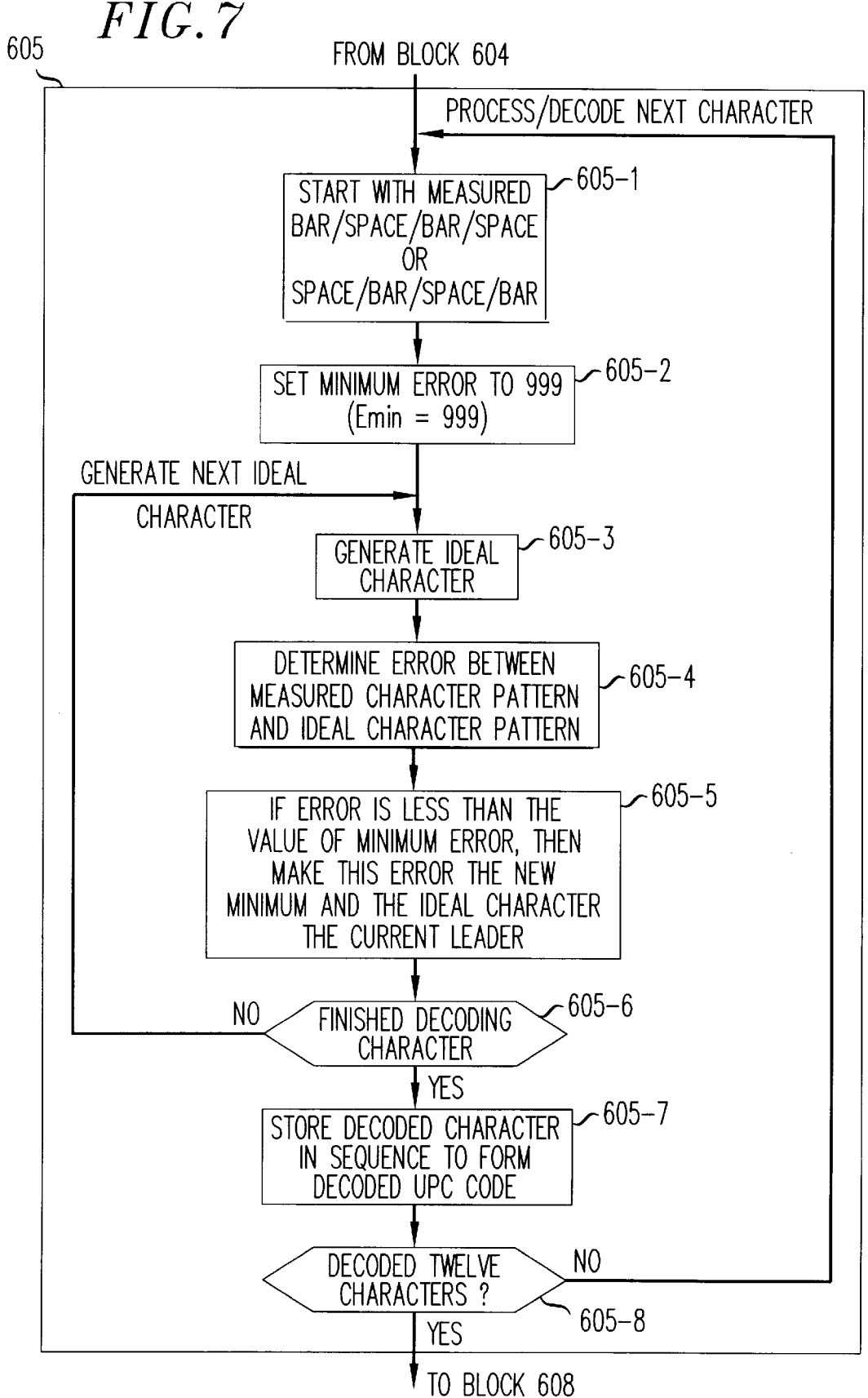

An expanded version of block 605 is shown in FIG. 7. FIG. 7 will be discussed in conjunction with the example shown in FIG. 8., which assumes that the measured pattern comprises a space-bar-space-bar pattern. Forming a group of samples to be decoded, FIG. 8 also assumes that the time units for the bar/space elements forming the measured pattern are 875, 2214, 1821 and 2090, respectively. The total duration of the measured character is thus 7000 units. Since a character comprises seven modules, then a scaling factor of $1/7^{th}$ of 7000 is used to scale the modules forming each of the ideal characters that are generated and compared with the measured pattern. (Such ideal characters may be generated beforehand and stored in memory or generated "on the fly" as one would generate binary values.) That is, each element (space or bar) of the measured pattern is compared with an opposite element (bar or space) of the ideal pattern/character, as will be discussed below. An error value indicative of the amount of difference between the measured element and ideal element is then generated. Each such elemental error is accumulated for each generated ideal pattern and the pattern associated with the smallest error value is then selected as the decoded pattern, in accordance with the principles of the invention.

Figure 8:
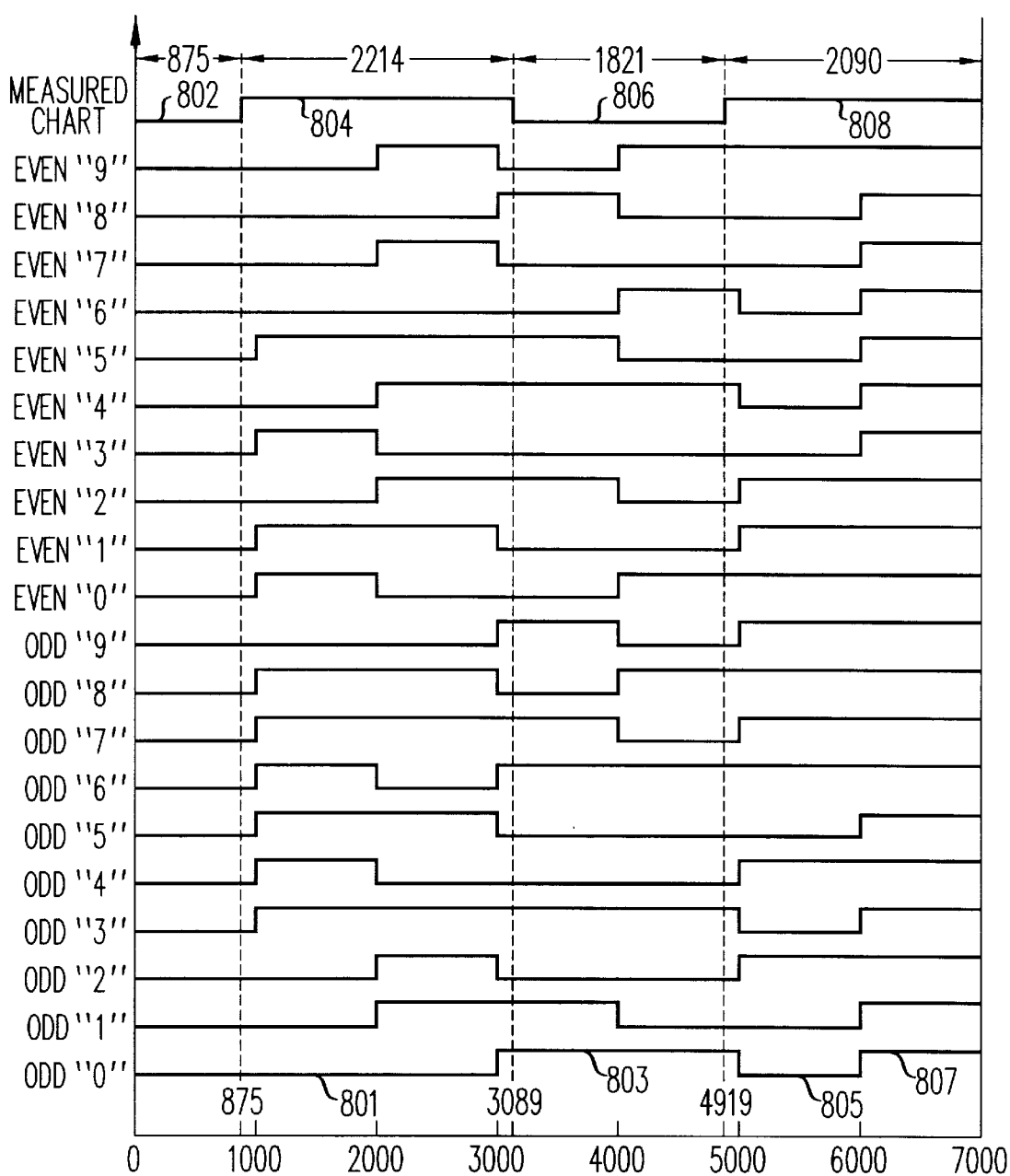
FIG. 8 is an illustrative example of a plurality of ideal symbols used in the decoding of a scanned symbol.

It is seen from FIG. 8 that twenty ideal patterns are generated respectively covering the values of odd zero through even 9. Each ideal pattern is scaled according to an assumed average module scaling factor for the modules forming the measured pattern (e.g., 1/7 of 7000), in accordance with an aspect of the invention.

With that in mind, the program (block 605-1) starts with a defined bar/space/bar/space (or space/bar/space/bar) pattern and sets (block 605-2) a variable $E_{min}$ (error) to an arbitrary value above 100%, e.g., 999. The program (block 605-3) then generates an ideal character, e.g., an odd 0, then scales the ideal character in the manner discussed above. The program (block 605-4) then compares each element of the measured character with the opposite elements (spaces and bars) of the ideal character. For example, the program compares space 802 and space 806 of the measured character with each of the bars of 803 and 807 of the ideal odd 0 character to determine the amount of intersection between those spaces and bars. The program also compares bars 804 and 808 of the measured character with each of the spaces 801 and 805 of the ideal odd character to determine the amount of intersection between those spaces and bars, as will be discussed below. In doing so, the program generates an error value indicative of each such intersection, in which a large error is indicative of a large accumulated intersection. If the error accumulated as a result of determining such intersection is less than the current value of $E_{min}$, then the program (block 605-5) sets $E_{min}$ to the value of the accumulated error and associates $E_{min}$ with the ideal odd 0. The program (block 605-6) then tests to see if it has completed comparing the measured character with each of the ideal characters of odd 0 through odd 9 and even 0 through even 9. If not, then the program returns to block 605-3 and generates the next ideal character, e.g., the ideal odd 1, and then proceeds as discussed above. If the program finds that it has compared the measured character with each of the ideal characters and thus has decoded the character in accordance with an aspect of the invention, it then (block 605-7 stores the decoded character in sequence to form the decoded UPC code. The program (block 605-8) then checks to see if it has decoded all twelve characters and proceeds to block 606, FIG. 6, if that is the case. Otherwise, it returns to block 605-1 to process and decode the next character in the manner discussed above.

Figure 9:
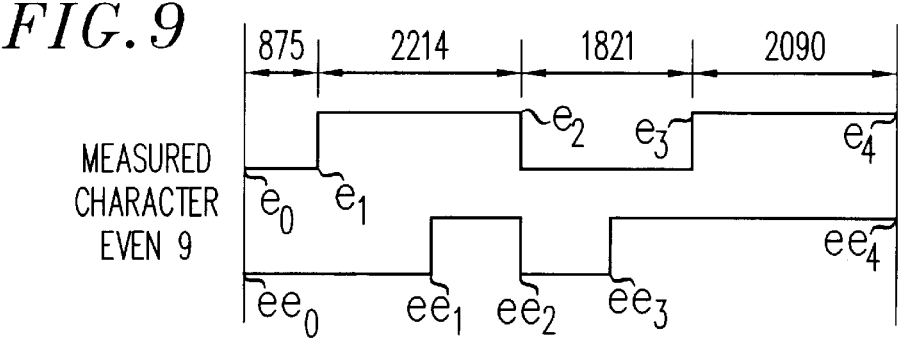
FIG. 9 is an illustrative example of the way in which a scanned symbol is compared with generated ideal symbols.

As mentioned above, the program compares a measured character with an ideal character by determining the level of intersection between the measured spaces (bars) and the bars (spaces) of the ideal character. The program does this by considering the spaces and bars to be rectangles and then comparing the rectangles for intersection. Specifically, FIG. 9 shows the measured character and ideal "even" character of FIG. 8. The edges of the measured character and ideal character are used to define rectangles, e.g., the rectangle defined by edged $e_0$ and $e_1$. The difference between the measured pattern and the ideal patterns is then determined as follows:

$$\text{Difference} = e_0 e_1 \cap ee_1 ee_2 + e_0 e_1 \cap ee_3 ee_4 + e_2 e_3 \cap ee_1 ee_2 +$$
$$e_2 e_3 \cap ee_3 ee_4 + e_1 e_2 \cap ee_0 ee_1 + e_1 e_2 \cap ee_2 ee_3 +$$
$$e_3 e_4 \cap ee_0 ee_1 + e_3 e_4 \cap ee_2 ee_3$$

which finds the intersections of all of the odd regions (spaces) of the measured pattern to the even regions (bars) of the ideal pattern and the intersection of the even regions (bars) of the measured pattern to the odd regions (spaces) of the ideal pattern. The value of the error is then the $\Sigma(\text{intersections}) \times 100\%/(\text{character width})$, in which 7000 is the character width assumed for the above illustrative example and may be different for each character that is so decoded. An example of a software program written in the well-known C programming language that implements the above comparison is listed in Appendix A, as following:

```
uint intersection (al,ar,bl,br)
        uint al,ar,bl,br;
{
if (br<=al) /* a right of b, no intersection */
        return (0);
if (ar<=bl) /* b right of a, no intersection */
        return (0);
/* a in b */
if (bl<=al && ar<=br)
        return (ar-al);
/* b in a */
if (al<=bl && br<=ar)
        return (br-bl);
/* bl in a */
if (al<=bl && bl<ar)
        return (ar-bl);
/* al in b */
if(bl<al && al<br)
        return (br-al);
```

The foregoing is merely illustrative of the principles of the invention. Those skilled in the art will be able to devise numerous arrangements, which, although not explicitly shown or described herein, nevertheless embody those principles that are within the spirit and scope of the invention.

APPENDIX A

```
uint intersection(al,ar,bl,br)
        uint al,ar,bl,br;
{
if(br<=al) /* a right of b, no intersection */
        return(0);
if(ar<=bl) /* b right of a, no intersection */
        return(0);
/* a in b */
if(bl<=al && ar<=br)
        return(ar-al);
/* b in a */
if(al<=bl && br<=ar)
        return(br-bl);
/* bl in a */
if(al<=bl && bl<ar)
        return(ar-bl);
/* al in b */
if(bl<al && al<br)
        return(br-al);
```

I claim:

1. A system for decoding a bar code formed from a plurality of characters, in which said characters form a unique identifier assigned to a particular item, said system comprising apparatus that receives a set of samples of signals obtained as a result of scanning the bar code, said samples including samples defining respective ones of the characters forming the bar code, a first processor that processes the set of samples to form respective measured bar code characters, a second processor that processes each of the measured characters in turn, and (a) generates a series of predetermined ideal characters scaled to a parameter associated with the measured character being processed, (b)

compares the entire measured character being processed with each of the generated ideal characters and (c) selects as the measured character being processed that one of the generated ideal characters that most closely compares with the measured character being processed, and a third process that forms each selected character into a sequence of characters and then identifies said particular item as a function of the sequence of selected characters, and wherein each of the ideal characters is a combination of a plurality of bars and spaces, and wherein the second processor performs said comparison by determining an intersection between each bar of the processed measured character with each space forming a respective one of the ideal characters and an intersection between each space of the processed measured character with each bar forming a respective one of the ideal characters, and then generating an error value as a function of an extent of each such intersection such that the selected ideal character is associated with the least error value.

2. The system of claim 1 wherein said series of predetermined ideal characters include a first series of digital codes representing respective decimal values and a second series of different digital codes also representing the decimal values.

3. The system of claim 1 further comprising a hand-held light pen that is used to scan the bar code and output each sample forming the set of samples of signals, and a processor that accumulates each sample that the light pen outputs to form the set of samples and then supplies the set of samples to the receiving apparatus.

4. The system of claim 1 wherein said plurality of bars and spaces is a combination of four bars and spaces.

5. The system of claim 1 wherein each of the bars and spaces forming a measured character being processed is associated with a respective scanning interval and wherein said scaling is done as a function of the sum of the scanning intervals associated with the character being processed.

6. A decoder for decoding signal samples characterizing symbols forming a particular pattern, said decoder comprising a first processor that receives the signal samples and form the samples into predetermined groups each characterizing a respective one of the symbols, and a second processor that processes each group of signal samples in turn and (a) generates a plurality of known symbols, (b) matches the group of signal samples being processed with each of the plurality of known symbols, and (c) selects and outputs as the decoded symbol that one of the plurality of known symbols that is the closest match to the group of signal samples being processed, and wherein said second processor includes a processor that determines an intersection between each of the plurality of known symbols with the group of samples being processed and then generates an error value as a function of the extent of each such intersection such that the selected decoded symbol is associated with the least error value.

7. The decoder of claim 6 wherein the second process includes a third process that scales each of the plurality of known symbols as a function of a scaling parameter derived from a particular parameter associated with the signal samples of the group being processed.

8. The decoder of claim 6 wherein said plurality of known symbols include a first series of digital codes representing respective decimal values and a second series of different digital codes also representing the decimal values.

9. The decoder of claim 6 further comprising a hand-held light pen operative for scanning information and outputting the signal samples, and a processor that accumulates each of the signal samples that the light pen outputs to form the group of samples and to then supply the group of samples to the decoder.

10. The decoder claim 6 wherein said signal samples are indicative of respective bars and spaces of a bar code being scanned and wherein each of the bars and spaces form a character of the bar code, said groups of signal samples representing respective one of the characters, and wherein said scaling parameter is derived as a function of the scanning interval of each of the group of characters being scanned.

* * * * *